(12) United States Patent
Grefenstein et al.

(10) Patent No.: US 10,611,535 B2
(45) Date of Patent: Apr. 7, 2020

(54) FILM LAMINATE COMPRISING A SEALING LAYER

(71) Applicant: Constantia Pirk GmbH & Co. KG, Pirk (DE)

(72) Inventors: Achim Grefenstein, Altrip (DE); Werner Geitner, Weiden (DE); Ingo Geillersdörfer, Mantel (DE)

(73) Assignee: Constantia Pirk GmbH & Co. KG, Pirk (DE)

( * ) Notice: Subject to any disclaimer, the term of this patent is extended or adjusted under 35 U.S.C. 154(b) by 188 days.

(21) Appl. No.: 15/547,361

(22) PCT Filed: Jan. 26, 2016

(86) PCT No.: PCT/EP2016/051512
§ 371 (c)(1),
(2) Date: Jul. 28, 2017

(87) PCT Pub. No.: WO2016/120239
PCT Pub. Date: Aug. 4, 2016

(65) Prior Publication Data
US 2018/0016071 A1    Jan. 18, 2018

(30) Foreign Application Priority Data

Jan. 29, 2015    (AT) ............... A50062/2015

(51) Int. Cl.
*B65D 65/40* (2006.01)
*B32B 27/32* (2006.01)
(Continued)

(52) U.S. Cl.
CPC ............... *B65D 65/40* (2013.01); *B32B 3/30* (2013.01); *B32B 27/08* (2013.01); *B32B 27/32* (2013.01);
(Continued)

(58) Field of Classification Search
CPC ..... B32B 27/08; B32B 3/30; B32B 2307/746; B32B 2581/00; B32B 81/00; B32B 27/36;
(Continued)

(56) References Cited

U.S. PATENT DOCUMENTS 4,686,125 A * 8/1987 Johnston ............... A61J 1/10
383/116
2005/0247960 A1 11/2005 Rim et al.
(Continued)

FOREIGN PATENT DOCUMENTS

CN        102376195 A     3/2012
DE        2148661 B2     11/1978
(Continued)

OTHER PUBLICATIONS

Austrian Search Report Application No. A 50062/2015 Completed Date: Jan. 29, 2015 3 Pages.
(Continued)

*Primary Examiner* — Rafael A Ortiz
(74) *Attorney, Agent, or Firm* — Whitmyer IP Group LLC

(57) ABSTRACT

In order to improve the sealing properties and the sliding properties of a sealing film, it is provided that surface structures are provided on a first side of the sealing film, wherein the largest thickness of the sealing film is at least 10% greater than the smallest thickness of the sealing film, and the largest lateral extension of the surface structures is smaller than 500 μm and a slip additive is added to the sealing film in an amount that yields an S-value of less than 10,000, and preferably less than 5,000.

23 Claims, 5 Drawing Sheets

(51) Int. Cl.
  *B32B 3/30*  (2006.01)
  *C08J 5/18*  (2006.01)
  *B32B 27/08*  (2006.01)
  *B32B 27/36*  (2006.01)
  *B65D 75/04*  (2006.01)
  *F04B 39/00*  (2006.01)
  *F04B 39/12*  (2006.01)

(52) U.S. Cl.
  CPC .............. *B32B 27/36* (2013.01); *B65D 75/04* (2013.01); *C08J 5/18* (2013.01); *F04B 39/0027* (2013.01); *F04B 39/0044* (2013.01); *F04B 39/127* (2013.01); *B32B 2307/31* (2013.01); *B32B 2307/746* (2013.01); *B32B 2581/00* (2013.01); *C08J 2323/04* (2013.01); *C08J 2323/06* (2013.01)

(58) Field of Classification Search
  CPC ........ B32B 27/32; B65D 65/40; B65D 31/02; B65D 75/04; C08J 5/18; C08J 2323/06
  USPC .............................. 220/62.11, 62.21, 62.22; 206/524.1–524.7; 428/34.2, 34.3, 428/34.6–34.8
  See application file for complete search history.

(56) References Cited

U.S. PATENT DOCUMENTS

| | | | |
|---|---|---|---|
| 2011/0163105 A1* | 7/2011 | Su | B32B 3/02 |
| | | | 220/660 |
| 2011/0293204 A1 | 12/2011 | Plourde | |

FOREIGN PATENT DOCUMENTS

| | | | | |
|---|---|---|---|---|
| DE | 69628339 T2 | 4/2004 | | |
| EP | 1340694 A2 | 9/2003 | | |
| EP | 1854841 A1 | 11/2007 | | |
| EP | 2149447 A1 | 2/2010 | | |
| EP | 2537770 A1 | 12/2012 | | |
| EP | 2799234 A1 | 11/2014 | | |
| FR | 2753996 A1 | 4/1998 | | |
| FR | 2753997 A1 | 4/1998 | | |
| JP | 05024158 A | * | 2/1993 | ........... B29C 59/022 |
| JP | H0524158 A | 2/1993 | | |
| JP | 2003181962 A | 7/2003 | | |
| WO | 9837143 A1 | 8/1998 | | |
| WO | 2006096894 A1 | 9/2006 | | |

OTHER PUBLICATIONS

International Search Report & Written Opinion Application No. PCT/EP2016/051512 Completed Date: Apr. 28, 2016; dated May 9, 2016 13 Pages.
International Preliminary Examination Report Application No. PCT/EP2016/051512 Completed Date: Jan. 16, 2017 12 Pages.

* cited by examiner

FILM LAMINATE COMPRISING A SEALING LAYER

TECHNICAL FIELD

The present invention relates to a sealing film made of a sealable polymer, and in particular a polyolefin or a mixture comprising a polyolefin, having a layer thickness in the range of 10 μm to 100 μm, preferably 10 μm to 80 μm, and especially particularly preferably in the range of 20 μm to 70 μm. The invention furthermore relates to a film laminate comprising a carrier layer and a sealing layer joined thereto, which is made of the sealing film according to the invention, and to a packaging comprising such a film laminate.

BACKGROUND

A sealing film for a sealing layer is produced, for example, by way of blown film extrusion or flat film extrusion. The film laminate for producing the bag is generally created by laminating (which is to say joining by way of an adhesive layer) multiple films. When producing sealing films from blown polyethylene (PE) (blown film) or cast polypropylene (PP) (cast film), according to the present state of the art so called slip additives (lubricants) or antiblock additives are added. The task of these is to render the usually relatively tacky polyolefins (such as PE or PP) smoother, so that these, during further processing, are able to slide better across the metal surfaces of the packaging machines or against themselves. If this step is not taken, undesirable machine stoppages and/or wrinkled sealed seams or leaking packagings may arise.

Processing such film laminates in packaging machines typically requires coefficients of friction (COF) of the sealing layer against steel in the range of 0.15 to 0.30, and of the sealing layer against itself in the range of 0.2 to 0.4. In particular, when processing the film laminates into bags, known as flow packs, in form-fill-seal (FFS) machines, the coefficient of friction against steel is a crucial quality feature of a packaging laminate.

The coefficients of friction indicated in the present application may be ascertained by way of the following test specification:

On a test block measuring 66×60×16 mm and having a weight of 500 g, a sample of a crease- and wrinkle-free sealing film is clamped onto one side of the test block (66×60 mm). The surface of the film to be tested must, of course, face outwardly. For clamping, the sample of the film may be larger than the size of the side of the test block. So as to measure the coefficient of friction against steel, the test block is placed on a steel table with the side on which the film is clamped. The test block is then pulled across the steel table, and the force required to do so is measured. The coefficient of friction is then ascertained as a ratio of the measured force and the weight of the test block (500 g). The procedure for measuring the coefficient of friction of the sealing layer against itself is the same, except that a crease- and wrinkle-free film is likewise clamped (with the side to be tested facing outside) onto the test table, onto which the test block is placed. Using a tensile testing machine, the test block is pulled over a measuring distance of 50 mm across the surface at a constant speed of 150 mm/min, and the tensile force is measured.

Usually, a distinction is made between the coefficient of static friction, which is derived from the maximum force before the test block moves, and the coefficient of dynamic friction. The latter is derived from the substantially constant, average force during the constant, jerk-free movement of the test block. Excessively tacky films move only in a jumpy way and thus cannot be measured since the forces fluctuate too drastically. Such films are unusable in a practical setting.

To achieve these coefficients of friction, according to the prior art slip additive concentrations having an S-value of 16,000 to 25,000 are used in the sealing film. The S-value is defined as the product from the layer thickness of the sealing film and the content of slip additive in ppm (parts per million).

Typically, slip additives used are oleamides, or the now preferred erucamides (ESA), which migrate from the sealing film outwardly over time and deposit on the surface of the sealing film, where they act as a lubricating film. The greatest disadvantage of these products is that these slip additives migrate, which can give rise to the following disadvantages:

The sliding friction of the PE or PP sealing film changes with increasing temperatures as a result of the improved solubility of the slip additives in the PE or PP, whereby the processing conditions of a film laminate comprising such a sealing film as the sealing layer change. This can make processing such film laminates (in a packaging machine) or such sealing films (in a laminating process) significantly more difficult.

The sliding friction changes after the film laminate has been laminated due to migration of the slip additives from the sealing film into the adhesive and/or laminating partner, whereby, once again, the processing conditions can change. This can make processing such film laminates significantly more difficult.

The laminating partner of the sealing film, such as PET or BOPP, becomes smoother due to the uptake of the slip additive. This may result in the film laminate no longer being transportable in the packing machine, whereby further processing would be impossible.

Antiblock additives are usually mineral fillers (such as silicates or talcum), the addition of which increases the surface roughness of the sealing film. While antiblock agents do not tend to migrate, use of these alone however does not sufficiently lower the coefficient of friction (COF) of the sealing film, and thus the sliding properties. While pure PE has a COF of 0.5 to more than 1 (complete blocking), minimal coefficients of friction of 0.3 against steel can be generated when using only antiblock additives. However, this is only possible if the added concentration is high, and the transparency of the resulting sealing film is thereby reduced, which is generally undesirable. To achieve the desired COF, it was therefore considered necessary to add slip additives.

When producing packagings in the form of bags, a film laminate, as described above, is often folded to yield a bag and is fused or sealed. The film is typically a multi-layer laminate, for example composed of a transparent outer layer, such as made of biaxially oriented polyethylene terephthalate (BOPET) or biaxially oriented polypropylene (BOPP), an inner sealing layer made of a sealable polymer in the form of a sealing film as described above, such as made of polyethylene (PE) or polypropylene (PP), and an optionally interposed barrier layer, such as made of aluminum or metallized plastic material (such as metallized PET). Sealing or fusing, as is sufficiently known, typically takes place between temperature-controlled sealing jaws, which are pressed together, whereby the sealing layer of the film melts and establishes the joint during subsequent cooling. Thus, in the present connection, sealable shall be understood to mean that the melting temperature of the sealing layer makes sealing possible. A wide variety of materials are used for the sealing layer, which are meltable and compressible at typical sealing temperatures above 100° C. This requirement results in various mixtures and co-extrudates of low density polyethylene (LDPE), linear low density polyethylene (LLDPE), ethylene vinyl acetate (EVA) and similar materials. Folding of the film, however, causes varying material thicknesses in the overlapping region, which during sealing can result in incomplete sealed seams, whereby the created bag forms undesirable air channels, for example.

This is schematically illustrated in FIG. 1 based on the example of a bag 1, which is a vertical tubular bag here. Here, the film of the bag 1 is first folded lengthwise to yield a tube and sealed along the longitudinal seam 2. At the upper and lower ends of the bag 1, the tube is sealed by way of a respective cross seam 3 so as to form a bag 1, whereby the product present therein is enclosed in the bag 1. The overlapping region of the two sealed seams, which is to say between the longitudinal seam 2 and the cross seam 3, is illustrated in enlarged form in FIG. 1. Due to the varying material thicknesses along the cross seam 3, it is possible that the overlapping film 5, in particular in the region of overlapping sealed seams, cannot be fully compressed by the sealing jaws 9a, 9b, whereby, during sealing of the cross seam 3, an air channel 4 may form in this region, causing the bag to leak. The film 5 is designed as a three-layer laminate here, comprising an outer BOPET layer 6, an intermediate layer 7 made of aluminum, and an inner sealing layer 8 made of PP. Similar problems also occur with other bag types, such as cross-bottom bags, stand-up bags, block bottom bags and the like, in the overlapping region of multiple film layers.

Similar problems can also occur when sealing so-called lidding films (generally composed of an aluminum base layer and a sealing layer applied thereon) on the edge of plastic containers, as is common in yogurt packagings, for example. Such lidding films are generally made of aluminum, plastic or paper, onto which a sealing layer is applied. Due to manufacturing tolerances during the production of the plastic containers and/or during the production of the film laminates of the lids, differences in thickness may also arise here, which cannot be compensated for during sealing by the pressure of the sealing jaws, and which can result in leaking of the packaging.

So as to reduce this problem during sealing, special materials have already been developed for use as the sealing layer; however, these are relatively expensive, and the packaging industry is thus reluctant to use these.

The thickness of the sealing layer cannot be reduced since the sealing layer must have a certain degree of compressibility. To be able to make the sealing layer thinner, special polymers are often admixed to the material of the sealing layer, which in turn, however, make the material more expensive again.

EP 2 537 770 A1 describes a film material comprising a foamed polymer layer, in particular for the production of bags for granular packaged goods. As a result of the foamed polymer layer, it is to be achieved that the contour of the granular packaged goods is not apparent on the outer bag surface.

US 2011/0293204 A1 describes a foamed, compressible polymer layer as a sealing layer to improve the sealing characteristics.

US 2005/0247960 A1, in turn, describes a film comprising an embossed sealing layer for forming a bag for vacuum packaging, wherein the embossing forms gaps, which form air channels during vacuum packaging through which air can be better removed. A visible pattern, such as in the form of letters or an arbitrary shape, can be provided as the embossing. To ensure that the embossing is easy to see with the naked eye and to ensure the function as an air channel during vacuum packaging, the embossing must be relatively deep, and in general significantly deeper than 100 μm. The formed air channels must be >~1 mm wide to allow a reasonable volume flow for removal of the air from the packaging to be achieved.

Embossed sealing layers are also used to prevent covering lids from adhering to one another when stacked on top of one another, which can cause problems during processing in processing machines. The embossing creates an air cushion between individual adjoining covering lids, whereby the covering lids can be easily and reliably separated. Examples of this can be found in EP 2 149 447 A1 or WO 2006/096894 A1.

SUMMARY

It is now an object of the present invention to provide a sealing film, by way of which both the problems, caused by the addition of slip additives for setting a coefficient of friction required for processing, and the problems of sealing such sealing films when differences in thickness occur in the sealing region can be reduced, without visually impairing the resulting product.

This object is achieved according to the invention by incorporating surface structures on a first side of the sealing film, wherein the largest thickness of the sealing film is at least 10% greater than the smallest thickness of the sealing film, and the largest lateral extension of the surface structures is smaller than 500 μm, preferably smaller than 400 μm, and especially particularly preferably smaller than 250 μm, and a slip additive is added to the sealing film in an amount that yields an S-value smaller than 10,000, preferably smaller than 5,000, and particularly preferably free of any migrating slip additives.

The surface structures increase the compressibility of the sealing film, which allows differences in thickness occurring in the sealing region to be better compensated for. Moreover, the required amount of material of the sealing film can be reduced since the average thickness of the sealing film is decreased by the surface structures. Additionally, however, it was also established that, when a lower amount of slip additives is present or no slip additives are present at all, the surface structures also allow a COF to be achieved that is favorable for processing the sealing film. As a result of the surface structures, it is thus possible to implement two objectives that are independent of one another using a single measure.

In particular, it was surprisingly also established that a sealing film according to the invention, even without or with little slip additive, has a sufficiently low COF to be able to be further processed in packaging machines. In this way, such slip additives in the sealing layer can be dispensed with in a film laminate according to the invention, or the necessary amount can at least be considerably reduced, whereby the disadvantages and problems associated with such additives, as mentioned above, can be avoided, or at least reduced.

Due to manufacturing restrictions, the largest thickness of an embossed plastic film (the sealing film) can, at present, not be arbitrarily high. Since plastic materials are flowable and presently the need exists to work with cooled embossing rollers, on which the plastic material solidifies, the technological upper limit for the largest thickness, at present, is approximately 300% of the smallest thickness. Within the scope of the present invention, however, it is also possible to use larger differences in thickness, in particular if the smallest thickness is measured in punctiform depressions, provided that this does not result in visual impairment of the surface.

The COF of an embossed sealing film according to the invention against itself can, in particular, be considerably reduced when the embossed structures (typically pyramids) are arranged diagonally to the longitudinal direction of the sealing film, wherein the longitudinal direction corresponds to the movement direction of the sealing film in the packaging machine.

The surface structures are advantageously designed as structures protruding from the first side.

However, it is especially particularly advantageous when the surface structures are designed as depressions on the first side, since the COF of the sealing film both against steel and against itself can then be sufficiently lowered solely by way of the surface structures.

Likewise, it is particularly advantageous when the surface structures are designed to have a hexagonal base surface area, since then as well the COF of the sealing film both against steel and against itself can be sufficiently lowered solely by way of the surface structures.

The surface structures are so small than they are not undesirably visible to the naked eye, whereby the sealing film can also be used in a film laminate comprising a sealing film that forms a sealing layer and a carrier layer joined thereto. In this way, the appearance of a film laminate comprising such a sealing film which is perceived by the naked eye is not negatively impacted.

For certain applications of the film laminate, it is advantageous if the carrier layer comprises a base layer and a barrier layer, wherein the barrier layer is arranged between the base layer and the sealing layer.

If the sealing film is a PE film produced by way of the flat film extrusion process, the sealing ability is even further improved by the higher MFI compared to a blown PE film.

The film laminate according to the invention is especially particularly advantageously used for a packaging produced by folding and sealing the film laminate, and for closing a receptacle by applying a lid made of the film laminate and sealing this to an edge of the receptacle.

BRIEF DESCRIPTION OF THE DRAWINGS

The present invention will be described in more detail hereafter with reference to FIGS. 1 to 10, which show advantageous embodiments of the invention by way of example and in a schematic and non-limiting manner. In the drawings.

DETAILED DESCRIPTION

Figure 2:
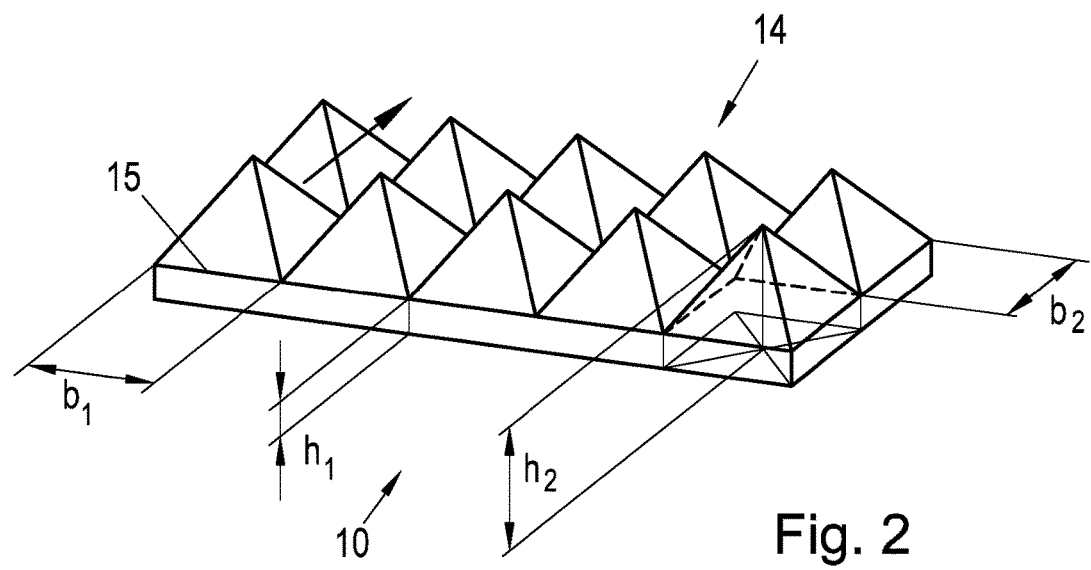
FIGS. 2 to 7 show a sealing film according to the invention comprising surface structures.

FIG. 2 shows a sealing film 10 according to the invention, for example for use as a sealable sealing layer on a film laminate for producing packagings, such as bags or closures for receptacles (known as lids). The sealing film 10 is preferably a polyolefin, such as polyethylene (PE) or polypropylene (PP) in the various available embodiments, for example such as low density polyethylene (LDPE) or linear low density polyethylene (LLDPE), or a mixture comprising such a polyolefin. Mixtures comprising a polyolefin and a plastomer, a polyolefin having particularly low density of less than 0.9 kg/dm$^3$, are often used as sealing films 10.

The sealing film 10 has surface structures 14 formed therein, such as embossed therein, on a first side 15. In FIG. 2, the juxtaposed surface structures 14 are disposed transversely to the longitudinal direction (indicated by the arrow) of the sealing film 10. As a result of the surface structures 14, the sealing film 10 has a layer thickness that varies between a smallest thickness $h_1$ and a largest thickness $h_2$. The layer thickness of the sealing film 10 shall be understood here to mean the average thickness between the smallest thickness $h_1$ and a largest thickness $h_2$. The surface structures 14 have lateral extensions $b_1$, $b_2$ in the plane of the sealing film 10 which extends in a planar manner.

Figure 3:
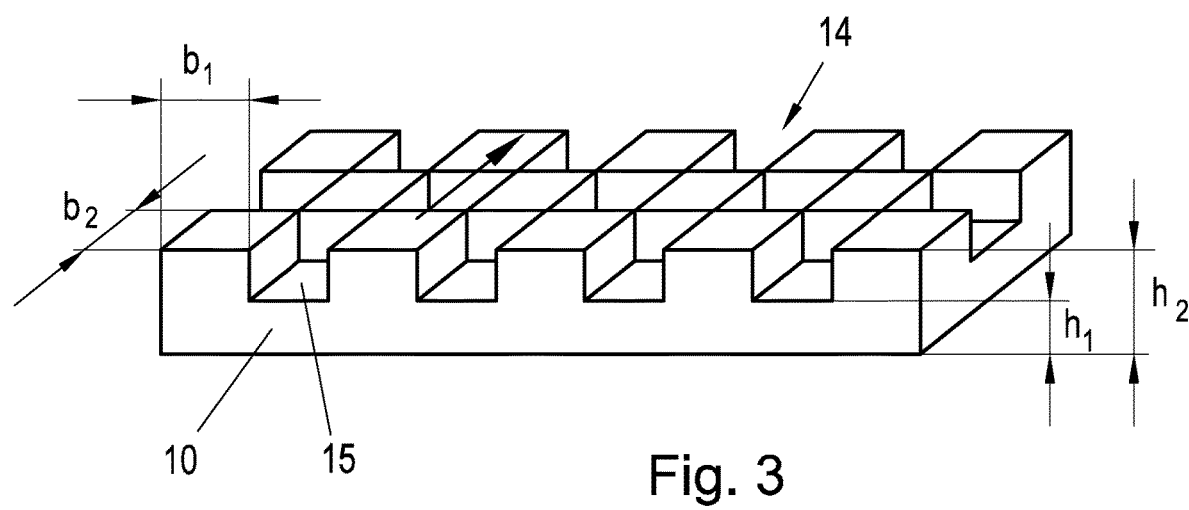
Figure 4:
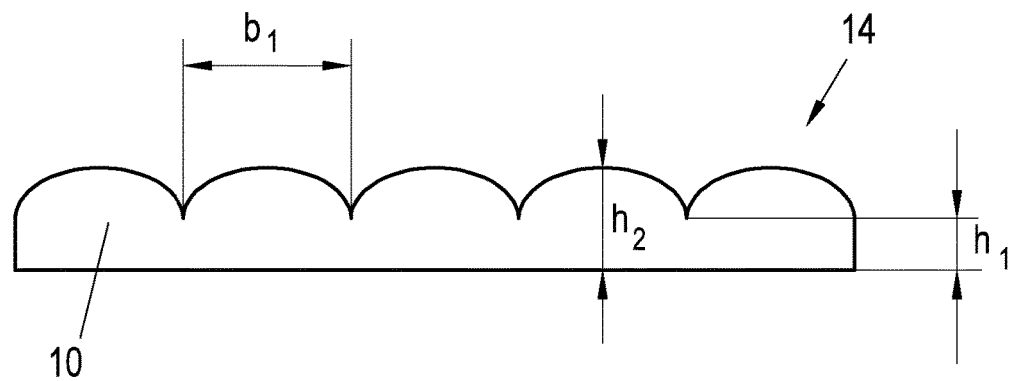

The surface structures 14 can be designed in a wide variety of manners, for example pyramidal as indicated in FIG. 2, or cuboid as indicated in FIG. 3, or dome-shaped as indicated in FIG. 4. The pyramids of the embodiment according to FIG. 2 do not have to have a square or rectangular base surface area, but the base surface area can take on any arbitrary design.

In the examples of FIGS. 2 to 4, the surface structures 14 protrude from the plane or from the first side 15 of the sealing film 10. However, surface structures 14 that are designed as depressions in the sealing film 10 are also possible, such as recessed pyramids, as is indicated in a top view in FIG. 5 and in a section A-A in FIG. 6. In such an embodiment, the tip of the pyramid is recessed with respect to the first side 15. Once again, the base surface area of the recessed pyramid can, in principle, take on any arbitrary design. In the exemplary embodiment according to FIG. 5, it is furthermore apparent that the juxtaposed surface structures 14 are oriented diagonally to the longitudinal direction (indicated by the arrow) of the sealing film 10.

Figure 7:
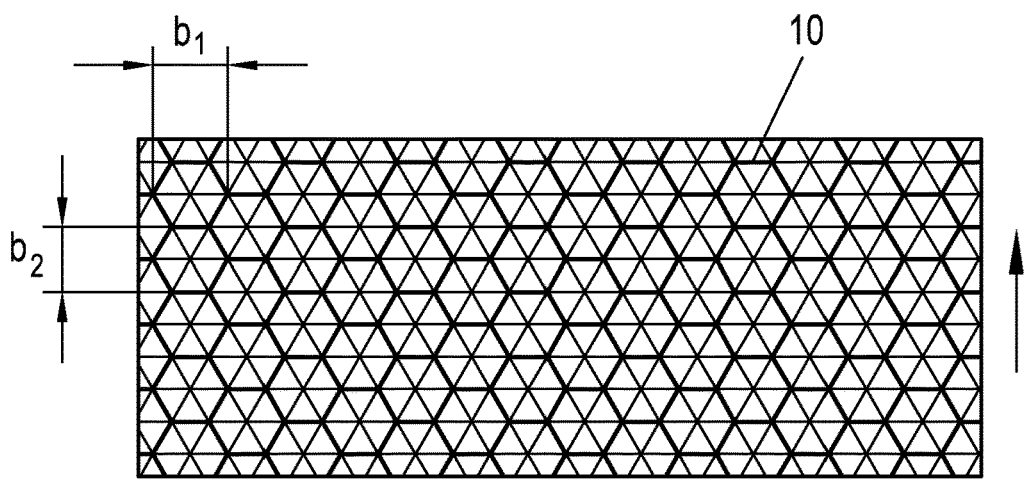

Particularly advantageous properties of the sealing film 10 arise in the case of a hexagonal base surface area, as shown in FIG. 7, regardless of whether the structures are recessed or whether the structures protrude from the plane, as is described in more detail hereafter.

Naturally, different shapes of the surface structures 14 than those shown in FIGS. 2 to 7 are also conceivable.

The surface structures 14 can be introduced by any arbitrary suitable method, such as by embossing the sealing film 10 using embossing rollers after blown film extrusion or flat film extrusion (off-line process). The surface structures 14 can also be produced in-line, utilizing the melting heat from the film production process.

The decisive factor for the desired properties of the sealing film 10 according to the invention is the dimensions of the surface structures 14. For this reason, the largest thickness $h_2$ of the sealing film 10 must be at least 10% greater than the smallest thickness $h_1$ of the sealing film 10 since otherwise it is not possible to displace sufficient material on overlapping sealed seams. For practical reasons, or for manufacturing-related restrictions, it is advantageous if the largest thickness $h_2$ is no more than 300% greater than the smallest thickness $h_1$ of the sealing film 10. In particular, the surface structure 14 of the sealing film 10 should not be visible to the naked eye, but at the most manifest itself in higher mattness of a homogeneous surface of the sealing film 10.

Figure 5:
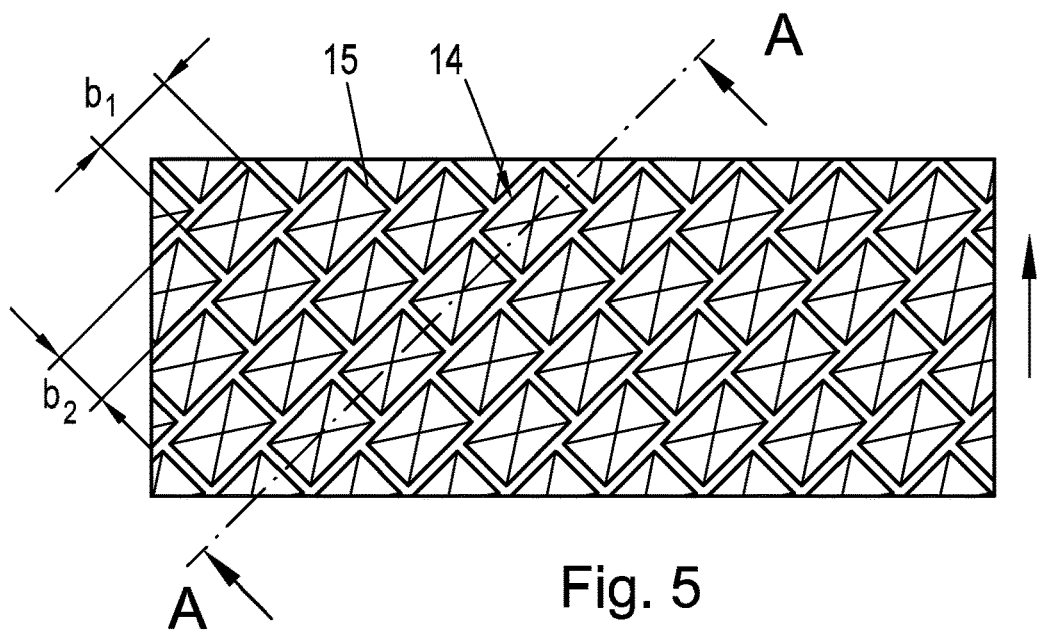
Figure 6:
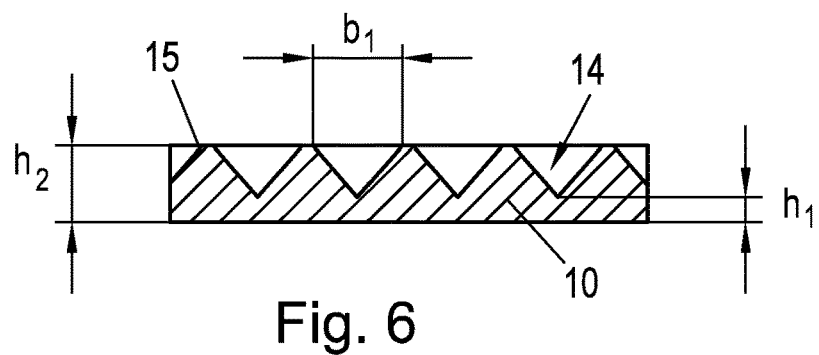
Figure 8:
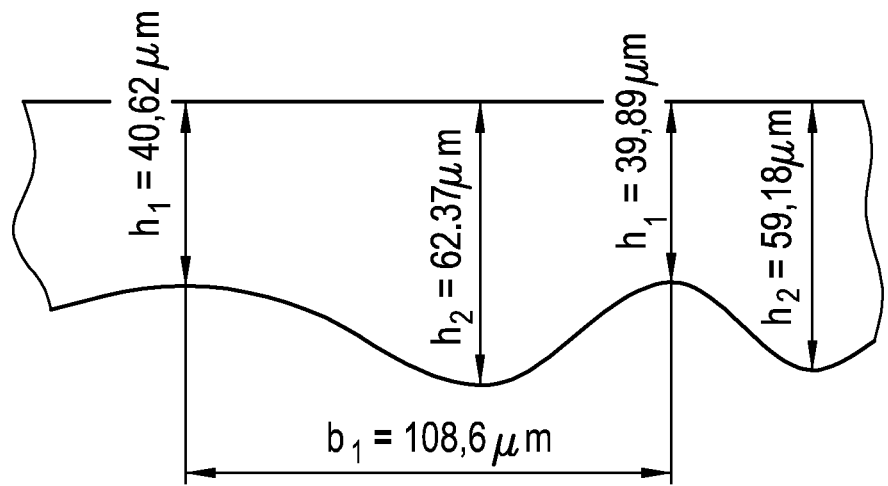
FIG. 8 shows a microtome section through a sealing film according to the invention.

These thicknesses $h_1$, $h_2$ can be ascertained in practice using the sufficiently known microtomy process. Thin sections (microtome sections) of a portion of the sealing film 10 are produced, which are then analyzed under the microscope. FIG. 8 schematically shows a microtome section through a sealing film 10 according to the invention. The surface structures 14 are shown in idealized form in FIGS. 2 to 7. In practice, it is possible, of course, that the desired structures are not ideally represented in the sealing film 10, as indicated in FIG. 8, simply due to the specimen preparation process or the fact that such a section is never made exactly parallel to the geometric structures. Individual elements of the surface structures 14 in the sealing film 10 also do not have to directly abut one another, as is indicated in FIG. 3 or FIG. 5.

The largest thicknesses $h_2$ of the portion of the sealing film 10 in FIG. 8 here is 62.37 μm, and the smallest thickness $h_1$ is 39.89 μm, whereby the largest thickness $h_2$ is 56.4% greater the smallest thickness $h_1$. However, it would also be possible to ascertain a mean value from the maximum and/or minimum thicknesses measurable on the portion and, based thereon, determine the ratio of the two thicknesses. In the example according to FIG. 8, the mean largest thickness $h_{2m}$=60.78 μm ((62.37+59.18)/2), whereby the mean largest thickness $h_2$ is 52.4% greater than the smallest thickness $h_1$. Likewise, it would also be possible, of course, to ascertain the mean smallest thickness $h_{1m}$ and to use this to calculate the ratio of the thicknesses, such as the ratio of the two mean thicknesses. Preferably, the smallest value of the different ascertainment methods can be used as a basis.

Likewise, the largest lateral extensions $b_1$, $b_2$ in the surface area of the sealing film 10 must be smaller than 500 μm, preferably smaller than 400 μm and especially particularly advantageously smaller than 250 μm, so that the surface structures 14 are not visible to the naked eye. In the example according to FIG. 8, the largest lateral extension is $b_1$=108.6 μm. Likewise, a mean value could also be derived from multiple measured largest lateral extensions, which then has to be smaller than 500 μm. For the lateral extensions, microtome sections in the planes in which the largest extensions are located are necessary, so as to be able to ascertain the largest lateral extensions $b_1$, $b_2$. The largest lateral extension, however, can also be ascertained more easily from a microscopic top view onto the surface structures 14 of the sealing film 10 (as in FIG. 5 or FIG. 7).

After the sealing film 10 is evenly embossed, it is generally sufficient to analyze a small embossed region of the sealing film 10, such as two or three juxtaposed surface structures 14, by way of microtome sections. Such a region is considered to be representative of the entire sealing film 10 comprising surface structures 14.

It is likewise conceivable to create multiple microtome sections of the sealing film 10, and to ascertain the thicknesses, or the lateral extensions, for each individual microtome section as described above. From this, it is then possible to calculate mean values across all microtome sections, which are then used as the smallest thickness, the largest thickness, and the largest lateral extension.

It is important to limit the largest lateral extension so as to prevent air inclusions and leaks during sealing and, above all, so as not to generate any visually undesirable orange peel, caused by the surface structures 14, on the usually high-gloss visible side of the sealing film 10. The surface structures 14 should be so small than these do not cause any undesirable visual effects to the naked eye.

When the largest thickness $h_2$ of the sealing film 10 is at least 10% greater than the smallest thickness $h_1$ of the sealing film 10 (optionally the mean values thereof), and the largest lateral extension ($b_1$, $b_2$) of the surface structures 14 (optionally the mean values thereof) is smaller than 500 μm, the surface structures 14 are not visible to the naked eye at the typical layer thickness of the sealing film 10 in the range of 10 μm to 100 μm, but are only discernible under the microscope or magnifying glass. The surface structures 14 only manifest themselves to the naked eye by a matte, satin-finish appearance of the embossed surface of the sealing film 10.

The effect of the surface structures 14 during sealing is that, compared to a conventional, substantially smooth sealing film 10, the sealing film 10 has increased compressibility, which allows potentially occurring differences in thickness during sealing to be better compensated for. At the same time, the amount of material required for the sealing film 10 can thus be reduced since the mean thickness of the sealing film 10 comprising surface structures is smaller than a conventional smooth sealing film 10.

Due to the surface structures 14 of the sealing film 10, however, it can also be achieved at the same time that less slip additive, or even no slip additive, must be added to achieve a certain advantageous coefficient of friction (COF) of the sealing film 10. Due to the negative properties of slip additives mentioned above, this represents a particular advantage of the surface structures 14. It was established that the S-value for the sealing film 10 should be smaller than 10,000 to at least adequately reduce the disadvantages. However, it is especially particularly advantageous if the added amount of slip additive is zero, which is to say if no slip additive at all is present in the sealing film 10.

The influence of the surface structures 14 on the COF will be described hereafter based on the following Tables 1 and 2.

TABLE 1

| No. | Material | Thickness | Embossing | Slip additive | COF steel stat./dyn. | COF sealing film stat./dyn. |
|---|---|---|---|---|---|---|
| 1 | LLDPE C8 | 70 μm | No | 500 ppm | 0.21/0.18 | 0.32/0.25 |
| 2 | LLDPE C8 | 70 μm | No | None | Cannot be measured | Cannot be measured |
| 3 | LLDPE C8 | 70 μm | Diagonal pyramid, square base surface area, diagonal of pyramid 185 μm, lateral extension $b_1/b_2$ = 130 μm, $h_1$ = 55 μm, $h_2$ = 85 μm | None | 0.25/0.17 | 0.93/0.83 |

TABLE 1-continued

| No. | Material | Thickness | Embossing | Slip additive | COF steel stat./dyn. | COF sealing film stat./dyn. |
|-----|----------|-----------|-----------|---------------|----------------------|------------------------------|
| 4 | LLDPE C4 | 50 g/m² | Pyramid, hexagonal base surface area, lateral extension $b_1$ = 120 μm, $h_1$ = 40 μm, $h_2$ = 60 μm | None | 0.20/0.18 | 0.38/0.35 |
| 5 | LDPE/LLDPE | 50 g/m² | Recessed pyramids, square base surface area, diagonal of pyramid 220 μm, lateral extension $b_1/b_2$ = 150 μm, $h_1$ = 42 μm, $h_2$ = 58 μm | None | 0.25/0.24 | 0.34/0.35 |

Sealing film no. 1 is a conventional sealing film made of LLDPE C8 having a thickness of 70 μm, comprising no surface structures 14 and erucamide (ESA) as a slip additive in an amount of 500 ppm, yielding an S-value of 35,000. This allows the sealing film to achieve a COF against steel and against itself which is favorable for processing the sealing film.

The comparative example in the form of sealing film no. 2 demonstrates the influence of the slip additive on the COF when no surface structures 14 are embossed. Here, the COF can no longer be measured by way of the above test specification. The COF is so high in such a sealing film that the test block would jump during the measurement of the COF, which renders measuring impossible.

Sealing film no. 3 is likewise produced without slip additive, yielding an S-value of 0, but is provided with surface structures 14 according to the invention. The indicated thickness of 70 μm (corresponds approximately to a basis weight of 65 g/m²) is the starting thickness prior to embossing the surface structures 14. The surface structures 14 are designed as pyramids protruding from the plane here, having a square base surface area and a side length of 130 μm. The pyramids are applied diagonally to the longitudinal direction of the sealing film 10 (as in FIG. 5). It is apparent here that the COF against steel drops within the desired range due to the surface structures 14, even though no slip additives have been added. The COF of the sealing film 10 against itself (last column) is still outside a range favorable for processing. The reason behind this is considered to be that the protruding pyramids can mesh with one another when sliding against one another, which increases the COF.

Sealing film no. 4 having a basis weight of 50 g/m² (corresponds to a thickness of approximately 40 to 60 μm prior to embossing) has a different surface structure 14. Here, this is designed as protruding pyramids having a hexagonal base surface area and a width $b_1$ of 120 μm (see FIG. 7), wherein the pyramids are oriented diagonally to the longitudinal direction of the sealing film (as in FIG. 7). Such surface structures 14 also allow a COF of the sealing film 10 against itself to be achieved which is favorable for further processing. A hexagonal surface structure 14 can thus be considered to be particularly advantageous. It is assumed here that the above meshing is substantially prevented by the hexagonal structures, regardless of whether the structures are oriented transversely or diagonally.

In sealing film no. 5, recessed pyramids (according to FIGS. 5 and 6) are embossed as surface structures 14. The pyramids are implemented with a square base surface area having a side length $b_1/b_2$ of 150 μm and are applied diagonally to the longitudinal direction of the sealing film 10 (as shown in FIG. 5). Such surface structures 14 likewise allow a COF of the sealing film 10 against steel and against itself to be achieved which is favorable for further processing. The reason behind this is considered to be that no protruding structures are present in the case of recessed surface structures 14, which can mesh with one another during sliding. A recessed surface structure 14 can thus also be considered to be particularly advantageous, regardless of whether the structures are oriented transversely or diagonally.

Table 2 includes another comparative example for a sealing film 10 made of a different polyolefin, which is a metallocene LLDPE (mLLDPE) here.

TABLE 2

| No. | Material | Thickness | Embossing | Slip additive | COF steel stat./dyn. | COF sealing film stat./dyn. |
|-----|----------|-----------|-----------|---------------|----------------------|------------------------------|
| 1 | mLLDPE | 60 g/m² | Diagonal pyramid, square base surface area, diagonal of pyramid 185 μm, lateral extension $b_1/b_2$ = 130 μm, $h_1$ = 50 μm, $h_2$ = 80 μm | None | 0.32/0.26 | Cannot be measured |
| 2 | mLLDPE | 60 g/m² | Diagonal pyramid, square base surface area, diagonal of pyramid 185 μm, lateral extension $b_1/b_2$ = 130 μm, $h_1$ = 50 μm, $h_2$ = 80 μm | Yes 800 ppm | 0.30/0.24 | 0.35/0.32 |

From the comparative example according to Table 2, the influence of the surface structures 14 on the COF in identically embossed sealing films with and without slip additive is apparent. The mLLDPE, which is very tacky in itself, has approximately the same COF against steel even without slip additive. Against itself, this type of surface structure 14 cannot be measured due to the "meshing" of the pyramids. A film made of the same material having no surface structures 14, however, would no longer be measurable even against steel. Such films are often used in industrial applications as self-adhesive surface protective films.

Figure 9:
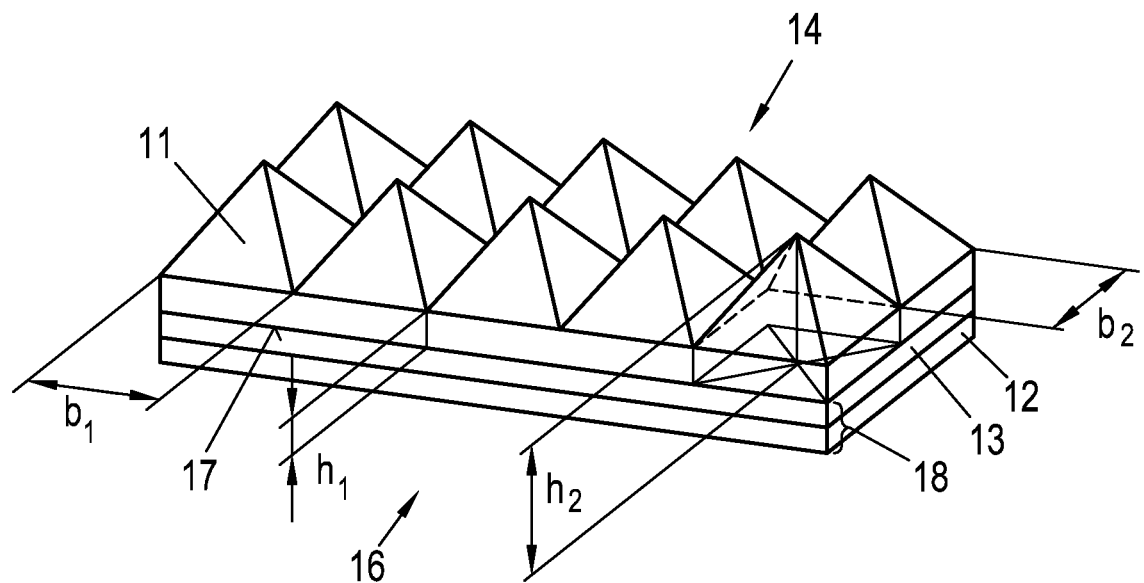
FIG. 9 shows a film laminate comprising a sealing film according to the invention.

The sealing film 10 according to the invention is preferably used in a film laminate 16, composed of a, usually imprinted, base layer 12 made aluminum, paper or plastic, and a sealable sealing layer 11 made of the sealing film 10, as is shown in FIG. 9, for example. For this purpose, the second side 17 of the sealing film 10 facing away from the first side 15 of the sealing film 10 comprising the surface structures 14 is joined to a carrier layer 18 to yield the film laminate 16. The sealing layer 11, of course, forms one of the outer sides of the film laminate 16. The carrier layer 18 can have a single-layer design, for example in the form of a base layer 12, or a multi-layer design, for example as a combination of a base layer 12 and a barrier layer 13. Paper, aluminum or a plastic material can be used as the base layer 12. The barrier layer 13 is an aluminum foil, for example, or a metallized film. The individual layers of the film laminate 16 are each joined to one another, for example via an adhesive layer, which is not shown, by way of lamination.

For the use of the film laminate 16 as a packaging, the layer thickness of the base layer 12 is typically in the range of 8 µm to 100 µm, for example 8 µm to 40 µm for BOPET, or 15 µm to 40 µm for aluminum, 10 µm to 50 µm for BOPP, and up to 100 µm for paper. The layer thickness of the sealing layer 11 is typically in the range of 10 µm to 100 µm, preferably in the range of 10 µm to 80 µm, and especially particularly advantageously in the range of 20 µm to 70 µm, and the layer thickness of the barrier layer 13 is typically in the range of 6 µm to 25 µm for aluminum, or analogous to the above-described thicknesses for the base layer 12 for metallized polymer films. However, it is also conceivable that the barrier layer 13 is incorporated into the sealing layer 11, for example in the form of a polyethylene-ethylene vinyl alcohol (PE-EVOH) copolymer film, whereby a separate barrier layer 13 can be dispensed with. The layer thicknesses of potentially interposed adhesive layers are typically in the range of 1 µm to 5 µm. The carrier layer 18, however, may also include other layers. Likewise, it may be provided that the carrier layer 18 is imprinted on the visible side. In the case of a transparent base layer 12 in the carrier layer 18, the layer adjoining the base layer 12 may also be imprinted.

Figure 1:
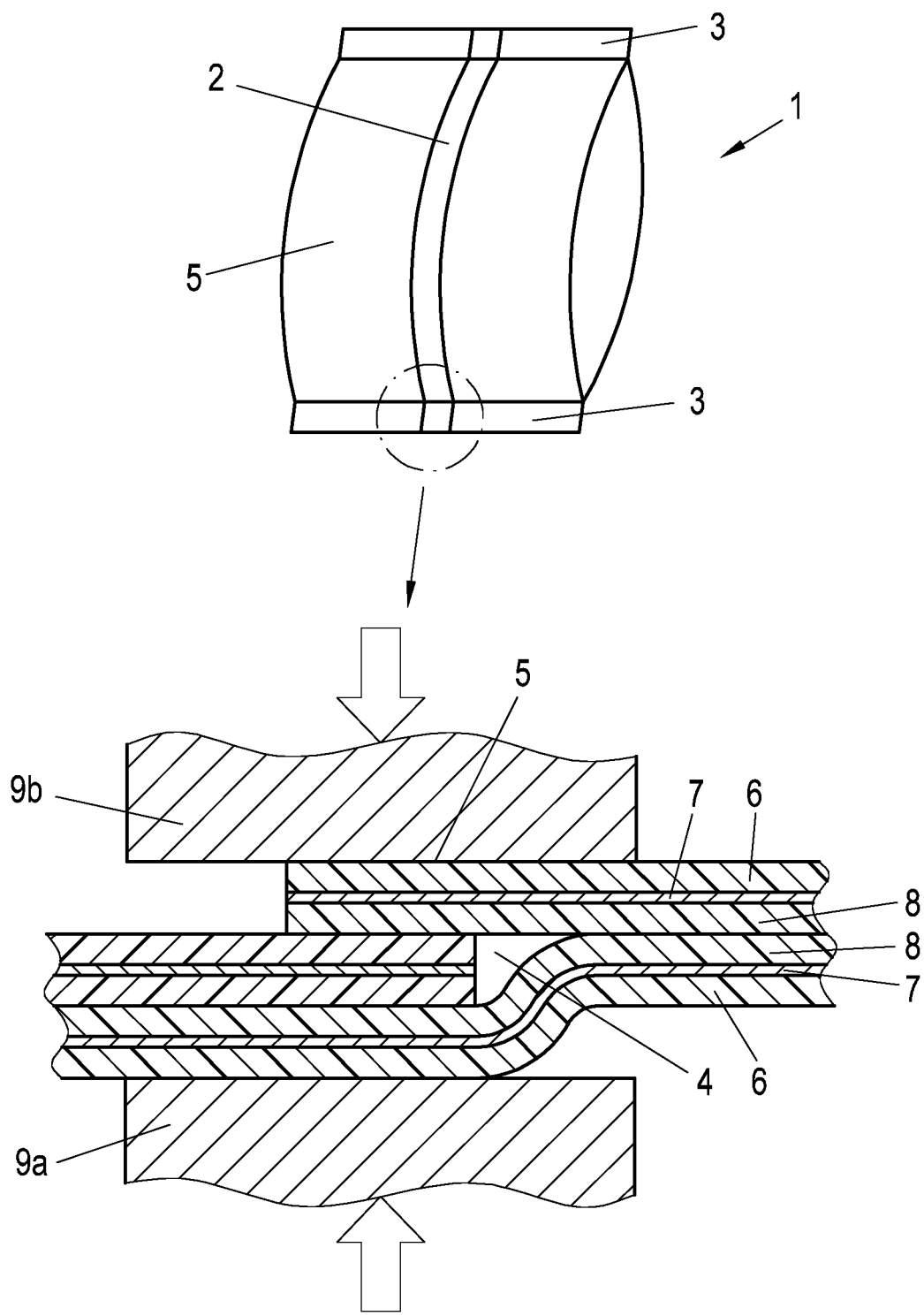
FIG. 1 shows a packaging bag according to the prior art.
Figure 10:
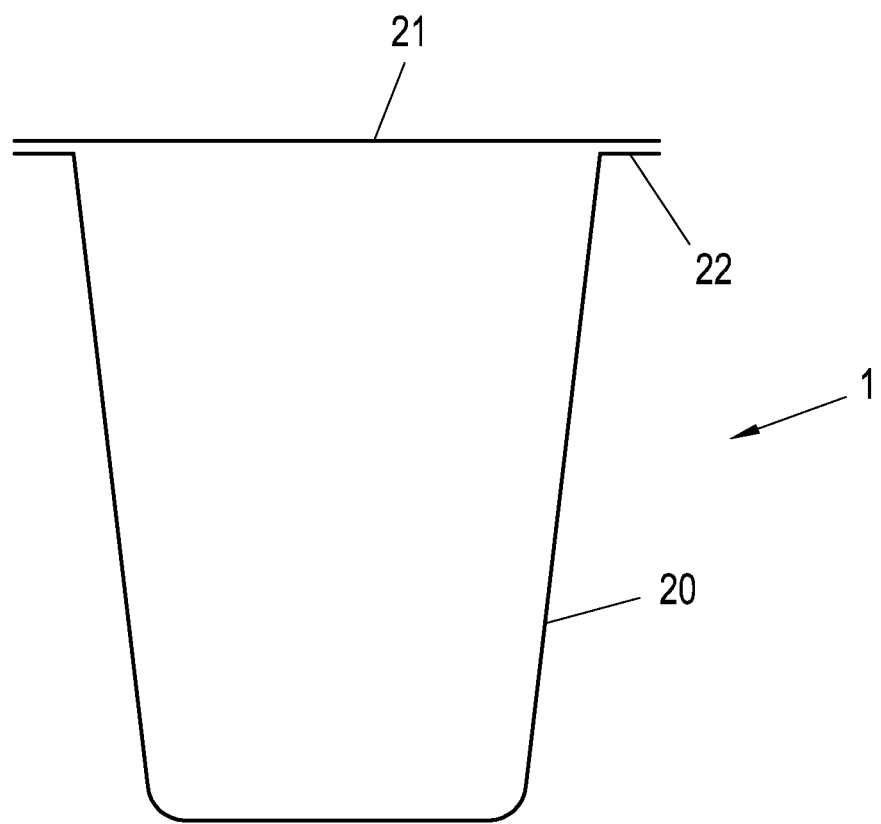
FIG. 10 shows the use of the film laminate according to the invention as a closure of a receptacle.

Such a film laminate 16 is used to produce packaging for foodstuffs, animal feed or hygiene articles, for example in the form of bags 1 or as membrane-like closures (lid 21) of receptacles (FIG. 10). For example, the film laminate 16 is folded to yield the desired packaging and is sealed along sealed seams, as is shown in FIG. 1 for a bag 1, for example. The film laminate 16 can also be stamped out in a suitable shape and serve as a lid 21 for closing a container 20, as shown in FIG. 10. For this purpose, the lid 21 is sealed onto a peripheral edge 22 of the container 20. To produce such a packaging, commercially available packaging machines can be used, which carry out these steps, which is why the process of producing such packagings will not be addressed in greater detail here. The sealing layer 11 of the film laminate 10 comprises the above-described surface structures 14 at least in areas in which sealing takes place, whereby the COF thus achieved ensures favorable processability of the film laminate 16 in the respective packaging machine.

In many applications, such as FFS machines, care must be taken that, according to the invention, the predominant surface area proportion is provided with the surface structures 14, since otherwise smooth sliding against the steel surface of the machines is not ensured. However, it is possible to have individual unembossed regions, for example for the configuration of customer logos.

The surface structures 14, however, also yield improved compressibility of the film laminate 16, whereby the sealing process is also supported on overlapping regions of multiple sealed seams 2, 3 (as is described by way of example in FIG. 1). Manufacturing-related differences in thickness in the sealing region can thus also be compensated for. Film laminates 16 adjoining one another and compressed during sealing between sealing jaws 9a, 9b can thus be better compressed, whereby the formation of air channels 4 in the overlapping region, or of leaks in the sealing region, can be at least reduced, and ideally prevented. At the same time, it is ensured by the film laminate 16 according to the invention that the visual appearance of the packaging, in particular on the visible side of the packaging, is not worsened, since the surface structures 14 are sufficiently small so as not to be perceived undesirably by the naked eye. Due to the small dimensions of the surface structures 14 of the sealing layer 11 (and in particular the thicknesses), these are also not apparent on the other, visible side of the film laminate 16, which is to say the outer side of the packaging.

Since such embossed films of the sealing layer 11, made of PE, for example, can also be produced by way of flat film extrusion, for which presently only smooth films made of PP are used, it is also possible to use PE raw materials having a higher melt flow index (MFI). Due to the improved flowability of the film material 16, closing of the air channels during sealing and the prevention of leaks on the sealed seam can be additionally supported.

The effect of the sealing film 10 according to the invention in a film laminate 16 during sealing will be described based on an example in the form of bags 1. For this purpose, bags, as shown in FIG. 1, were produced on a commercially available packaging machine, which is a so-called vertical form-fill-seal (vertical FFS) machine here, using a film laminate A and a film laminate B, and subsequently the tightness of the bags thus produced was tested. The sealing temperature $T_Q$ for sealing the cross seam 3 and the sealing time $i_s$ were varied so as to ascertain the minimum sealing time $t_s$ for each sealing temperature $T_Q$ for the greatest productivity, which is to say the number A of bags produced per minute. The sealing time $t_s$ influences the cycle time $t_z$, which is to say the time required to produce one bag. The sealing temperature for the longitudinal seam 2 was left constant at 160° C. For each set of parameters, 30 packages were produced and tested for tightness. The tightness was tested in a water bath at a negative pressure of 650 mbar. The bags are placed under water, and the air above the water is evacuated to the negative pressure. This causes the remaining air trapped in the bags to inflate and the sealed seam to fail if the same is damaged, which is visible due to air bubbles arising in the water.

Film laminate A is a conventional laminate comprising a base layer 12 made of BOPET having a layer thickness of 12 µm, and a sealing layer 11 bonded thereto, comprising a conventional smooth PE film, which was produced by way of blown film extrusion and is primarily made of LDPE and which has a layer thickness of 60 µm, a basis weight of 55 g/m² and a melting temperature of 113° C. The sealing film 10 of the sealing layer 11 provided with 400 ppm ESA as a slip additive (S-value of 24,000) and 2000 ppm antiblock agent has a COF (static/dynamic) of 0.34/0.27 against itself and of 0.20/0.16 against steel. The static COF relates to the COF when relative movement is absent, and the dynamic COF relates to the COF when relative movement is present.

Film laminate B is a laminate comprising a base layer 12 made of BOPET having a layer thickness of 12 μm, and an embossed sealing layer 11 according to the invention bonded thereto, which has surface structures 14 and is commercially available as a film for medical and hygiene applications. The surface structures 14 are implemented as embossed structures here in the form of hexagonal structures protruding from the surface (Table 1, sealing film no. 4). The sealing layer 11 used is a sealing film in the form of a PE film made primarily of less expensive LLDPE butene C4, having a mean layer thickness of 51.31 μm, a basis weight of 50 g/m² and a melting temperature of 121° C. Due to the surface structures 14, this sealing layer 11 has a COF (static/dynamic) of 0.38/0.35 against itself and of 0.20/0.18 against steel, even without any slip additives such as ESA and antiblock additives. The COF of the film laminate according to the invention is thus exactly in the desired range for further processing such films on common packaging machines. Even during the subsequent experiments regarding processing on a packaging machine in the form of a vertical form-fill-seal (vFFS) machine, it was confirmed that no problems in this regard during processing were observed.

The result is shown in Table 3.

TABLE 3

| $t_s$ [s] | $t_z$ [s] | A | $t_Q$ [° C.] | Film laminate A (comparison) Tightness of pack. | Film laminate B (invention) Tightness of pack. |
|---|---|---|---|---|---|
| 0.30 | 0.55 | 109 | 150° C. | 60% | 83% |
| 0.25 | 0.5 | 120 | 160° C. | 90% | 97% |
| 0.20 | 0.45 | 133 | 165° C. | 23% | 97% |
| 0.25 | 0.5 | 120 | 165° C. | 100% | 100% |
| 0.20 | 0.45 | 133 | 170° C. | 23% | 97% |

As is apparent from Table 3, the sealing time $t_s$ can be shortened when using a film laminate B according to the invention, which directly impacts the number A of bags that can be produced per minute. This is achieved with an inexpensive raw material and a lower amount of material. This is all the more remarkable as the film formulation of the sealing layer 11 has not yet been optimized in any way. The effect is only due to the improved compressibility achieved by the surface structures 14 in the sealing layer 11.

The invention claimed is:

1. A bag packaging, produced from a film laminate comprising a carrier layer and a sealing film forming a sealing layer,
    the bag packaging being produced by folding and sealing the film laminate, whereby overlapping sealed seams are created,
    characterized in that the sealing film comprises a sealable polymer having a layer thickness in the range of 10 μm to 100 μm,
    wherein surface structures being incorporated on a first side of the sealing film at least in areas where sealing takes place,
    wherein the largest thickness of the sealing film being at least 10% greater than the smallest thickness of the sealing film and the largest lateral extension of the surface structures being smaller than 500 μm,
    the sealing film has an S-value of less than 10,000, the S-value defined as a product of a thickness of the sealing film in micrometer and an amount of slip additive in parts per million,
    in that the surface structures are formed on a first side of the sealing film and an opposite second side of the sealing film is joined to the carrier layer of the film laminate,
    in that during sealing, adjoining film laminates with the sealing film are pressed together and compressed, in particular in the overlapping region of multiple sealed seams, so as to avoid the formation of air channels in the overlapping region,
    a coefficient of friction of the sealing film against steel is in the range of 0.15 to 0.30.

2. The bag packaging according to claim 1, wherein the sealing film is produced without adding slip additive.

3. The bag packaging according to claim 1, wherein the largest thickness of the sealing film is no more than 300% greater than the smallest thickness of the sealing film.

4. The bag packaging according to claim 1, wherein the largest lateral extension of the surface structures is smaller than 400 μm.

5. The bag packaging according to claim 1, wherein the surface structures are oriented diagonally to the longitudinal direction of the sealing film.

6. The bag packaging according to claim 1, wherein the surface structures protrude from the first side of the sealing film.

7. The bag packaging according to claim 1, wherein the surface structures are formed as depressions on the first side of the sealing film.

8. The bag packaging according to claim 1, wherein the surface structures have a hexagonal base surface area.

9. The bag packaging according to claim 1, wherein the sealing film is a polyolefin film, and preferably a polyethylene film or a polypropylene film, preferably produced by way of a flat film extrusion process or a blown film extrusion process.

10. The bag packaging according to claim 1, wherein the sealing film is free of antiblock additives.

11. The bag packaging according to claim 1, wherein the sealing layer has an average layer thickness in the range of 10 μm to 100 μm.

12. The bag packaging according to claim 1, wherein the carrier layer comprises a base layer.

13. The bag packaging according to claim 1, wherein the carrier layer comprises a base layer and a barrier layer, wherein the barrier layer is arranged between the base layer and the sealing layer.

14. The bag packaging according to claim 1, wherein the sealable polymer has a layer thickness in the range of 10 μm to 80 μm.

15. The bag packaging according to claim 1, wherein the sealable polymer has a layer thickness in the range of 20 μm to 70 μm.

16. The bag packaging according to claim 1, wherein the slip additive is added to the sealing film in an amount that yields an S-value of less than 5,000.

17. The bag packaging according to claim 2, wherein the largest thickness of the sealing film is no more than 300% greater than the smallest thickness of the sealing film.

18. The bag packaging according to claim 1, wherein the largest lateral extension of the surface structures is smaller than 250 μm.

19. The bag packaging according to claim 1, wherein the sealing layer has an average layer thickness in the range of 10 μm to 80 μm.

20. The bag packaging according to claim 1, wherein the sealing layer has an average layer thickness in the range of 20 μm to 70 μm.

21. A sealing film, comprising:
- a sealable polymer having a thickness in the range of 10 μm to 100 μm;
- surface structures incorporated on a first side of the sealing film in areas where sealing takes place;
- a largest thickness of the sealing film is at least 10% greater than a smallest thickness of the sealing film;
- a largest lateral extension of the surface structures is smaller than 500 μm;
- the sealing film has an S-value of less than 10,000, the S-value defined as a product of a thickness of the sealing film in micrometer and an amount of slip additive in parts per million;
- the sealing film has a coefficient of friction against steel in the range of 0.15 to 0.30.

22. The sealing film according to claim 21, wherein the S-value is 0.

23. A bag packaging produced by a film laminate, comprising:
- the sealing film of claim 21;
- a carrier layer joined to the sealing film on a second side of the sealing film opposite the first side;
- the film laminate folded and sealed to created overlapping sealed seams, the sealing film pressed together and compressed to avoid the formation of air channels in the overlapping sealed seams.

* * * * *